(12) United States Patent
Rong et al.

(10) Patent No.: US 11,290,315 B2
(45) Date of Patent: *Mar. 29, 2022

(54) SYSTEM AND METHOD FOR SETTING CYCLIC PREFIX LENGTH

(71) Applicant: Futurewei Technologies, Inc., Plano, TX (US)

(72) Inventors: Zhigang Rong, San Diego, CA (US); Yunsong Yang, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 52 days.

This patent is subject to a terminal disclaimer.

(21) Appl. No.: 16/789,113

(22) Filed: Feb. 12, 2020

(65) Prior Publication Data

US 2020/0213175 A1 Jul. 2, 2020

Related U.S. Application Data

(63) Continuation of application No. 14/869,411, filed on Sep. 29, 2015, now Pat. No. 10,749,724.

(Continued)

(51) Int. Cl.
*H04L 27/26* (2006.01)
*H04B 7/0452* (2017.01)
(Continued)

(52) U.S. Cl.
CPC ........ *H04L 27/2666* (2013.01); *H04B 7/0452* (2013.01); *H04L 5/0007* (2013.01); (Continued)

(58) Field of Classification Search
CPC ............. H04L 27/2666; H04L 27/2646; H04L 27/2607; H04B 7/0452; H04B 5/0007; H04W 84/12; H04W 72/1289
See application file for complete search history.

(56) References Cited

U.S. PATENT DOCUMENTS 8,422,577 B1 4/2013 Shetty et al.
8,565,082 B1 10/2013 Vargantwar et al.
(Continued)

FOREIGN PATENT DOCUMENTS

CN 101079688 A 11/2007
CN 101208889 A 6/2008
(Continued)

OTHER PUBLICATIONS

Cariou, L., et al., "High-efficiency WLAN," IEEE 802.11-13/0331r5, Mar. 19, 2013, 21 pages.
(Continued)

*Primary Examiner* — Sharmin Chowdhury
(74) *Attorney, Agent, or Firm* — Slater Matsil, LLP

(57) ABSTRACT

A method for communicating in a wireless communications system includes receiving a trigger frame comprising scheduling information and a cyclic prefix indicator indicating a first length of a first cyclic prefix, wherein the trigger frame is received in accordance with the first cyclic prefix, determining a second length of a second cyclic prefix for a transmission in accordance with the scheduling information and the cyclic prefix indicator, and transmitting the transmission with the second cyclic prefix.

22 Claims, 8 Drawing Sheets

Related U.S. Application Data

(60) Provisional application No. 62/082,234, filed on Nov. 20, 2014.

(51) Int. Cl.
    *H04L 5/00*     (2006.01)
    *H04W 72/12*     (2009.01)
    *H04W 84/12*     (2009.01)

(52) U.S. Cl.
    CPC ...... *H04L 27/2607* (2013.01); *H04L 27/2646* (2013.01); *H04W 72/1289* (2013.01); *H04W 84/12* (2013.01)

(56) References Cited

U.S. PATENT DOCUMENTS

| | | |
|---|---|---|
| 9,184,968 B2 | 11/2015 | Dimou et al. |
| 9,510,311 B2 | 11/2016 | Li et al. |
| 2006/0176966 A1 | 8/2006 | Stewart et al. |
| 2007/0025390 A1 | 2/2007 | Jain |
| 2009/0034638 A1 | 2/2009 | Sawahashi et al. |
| 2009/0125363 A1 | 5/2009 | Frederiksen et al. |
| 2010/0329236 A1 | 12/2010 | Sampath et al. |
| 2011/0069743 A1 | 3/2011 | Chang et al. |
| 2011/0110323 A1 | 5/2011 | Kim et al. |
| 2011/0149771 A1 | 6/2011 | Abeta et al. |
| 2011/0164597 A1 | 7/2011 | Amini et al. |
| 2011/0249764 A1 | 10/2011 | Sawahashi et al. |
| 2011/0267996 A1 | 11/2011 | Guan et al. |
| 2012/0170524 A1 | 7/2012 | Ren et al. |
| 2012/0170563 A1 | 7/2012 | Abraham et al. |
| 2012/0270535 A1 | 10/2012 | Chen et al. |
| 2012/0281551 A1 | 11/2012 | Alanaerae |
| 2013/0022090 A1 | 1/2013 | Weng et al. |
| 2013/0128765 A1 | 5/2013 | Yang et al. |
| 2013/0272435 A1 | 10/2013 | Shellhammer |
| 2013/0272436 A1 | 10/2013 | Makhlouf et al. |
| 2013/0308563 A1 | 11/2013 | Xiao et al. |
| 2013/0315321 A1 | 11/2013 | Rajagopal et al. |
| 2015/0117363 A1 | 4/2015 | Rong et al. |
| 2015/0295743 A1 | 10/2015 | Hwang et al. |
| 2015/0304014 A1 | 10/2015 | Sadeghi et al. |
| 2015/0304077 A1* | 10/2015 | Cao ............ H04B 7/12 370/295 |
| 2015/0358983 A1 | 12/2015 | Frenger et al. |
| 2016/0072654 A1* | 3/2016 | Choi ............ H04L 5/0007 370/329 |
| 2016/0105304 A1 | 4/2016 | Kwon |
| 2016/0105863 A1 | 4/2016 | Li et al. |
| 2016/0249381 A1* | 8/2016 | Choi ............ H04W 74/004 |
| 2017/0105143 A1* | 4/2017 | Seok ............ H04L 5/0091 |
| 2017/0338931 A1* | 11/2017 | Kim ............ H04L 1/1614 |

FOREIGN PATENT DOCUMENTS

| | | |
|---|---|---|
| CN | 101248622 A | 8/2008 |
| CN | 101640579 A | 2/2010 |
| CN | 101790202 A | 7/2010 |
| CN | 102695264 A | 9/2012 |
| CN | 103733552 A | 4/2014 |
| EP | 3056053 A2 | 8/2016 |
| IN | 201617017053 A | 8/2016 |
| JP | 2006311359 A | 11/2006 |
| JP | 2010081446 A | 4/2010 |
| JP | 2012531829 A | 12/2012 |
| KR | 20080011189 A | 1/2008 |
| KR | 20100129315 A | 12/2010 |
| WO | 2009072171 A1 | 6/2009 |
| WO | 2012090028 A1 | 7/2012 |
| WO | 2013010247 A1 | 1/2013 |
| WO | 2014069788 A1 | 5/2014 |
| WO | 2014112907 A1 | 7/2014 |

OTHER PUBLICATIONS

Cariou, L., et al., "High-efficiency WLAN Straw poll," IEEE 802.11-13/0339r10, Mar. 19, 2013, 7 pages.

Huawei, et al., "Analysis on uplink/downlink time delay issue for distributed antenna system," 3GPP TSG RAN WG1#55, R1-084336, Prague, Czech Republic, Nov. 10-14, 2008, 8 pages.

"Remaining details on EPDCCH in MBSFN subframes," 3GPP TSG-RAN WG1 #71, R1-124853, New Orleans, LA, Nov. 12-16, 2012, 3 pages.

* cited by examiner

SYSTEM AND METHOD FOR SETTING CYCLIC PREFIX LENGTH

This application is a continuation of U.S. patent application Ser. No. 14/869,411, filed on Sep. 29, 2015, entitled "System and Method for Setting Cyclic Prefix Length," which claims the benefit of U.S. Provisional Application No. 62/082,234, filed on Nov. 20, 2014, entitled "System and Method for Setting Cyclic Prefix Length," all of which applications are hereby incorporated herein by reference.

TECHNICAL FIELD

The present invention relates to digital communications, and, in particular embodiments, to setting cyclic prefix (CP) length.

BACKGROUND

The number of devices using Wireless Local Area Networks (WLAN) continue to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STA)) will also increase. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

A newly formed IEEE 802.11 Study Group named "High Efficiency WLAN (HEW)" has been formed to study, among other things, improving system performance in a high density environment. As a result of the study of the HEW Study Group, a Task Group called TGax was formed.

SUMMARY OF THE DISCLOSURE

Example embodiments of the present disclosure which provide a system and method for setting cyclic prefix length.

In accordance with another example embodiment of the present disclosure, a method for communicating in a wireless communications system is provided. The method includes receiving, by a station, a trigger frame comprising scheduling information and a cyclic prefix indicator indicating a first length of a first cyclic prefix, wherein the trigger frame is received in accordance with the first cyclic prefix, determining, by the station, a second length of a second cyclic prefix for a transmission in accordance with the scheduling information and the cyclic prefix indicator, and transmitting, by the station, the transmission with the second cyclic prefix.

In accordance with another example embodiment of the present disclosure, a method for communicating in a wireless communications system is provided. The method includes transmitting, by an access point, a trigger frame comprising scheduling information and a cyclic prefix indicator indicating a first length of a first cyclic prefix, wherein the trigger frame is transmitted in accordance with the first cyclic prefix, and wherein the scheduling information and the cyclic prefix indicator is configured to prompt an adjustment to a second length of a second cyclic prefix, and receiving, by the access point, a first transmission from a station, the first transmission with the second length of the second cyclic prefix determined in accordance with the scheduling information and the cyclic prefix indicator.

In accordance with another example embodiment of the present disclosure, a station is provided. The station includes a receiver, a processor operatively coupled to the receiver, and a transmitter operatively coupled to the processor. The receiver receives a trigger frame comprising scheduling information and a cyclic prefix indicator indicating a first length of a first cyclic prefix, wherein the trigger frame is received in accordance with the first cyclic prefix. The processor determines a second length of a second cyclic prefix for a transmission in accordance with the scheduling information and the cyclic prefix indicator. The transmitter transmits the transmission with the second cyclic prefix.

In accordance with another example embodiment of the present disclosure, an access point is provided. The access point includes a transmitter, and a receiver operatively coupled to the transmitter. The transmitter transmits a trigger frame comprising scheduling information and a cyclic prefix indicator indicating a first length of a first cyclic prefix, wherein the trigger frame is transmitted in accordance with the first cyclic prefix, and wherein the scheduling information and the cyclic prefix indicator are configured to prompt an adjustment to a second length of a second cyclic prefix. The receiver receives a first transmission from a station, the first transmission with the second length of the second cyclic prefix determined in accordance with the scheduling information and the cyclic prefix indicator.

One advantage of an embodiment is that the cyclic prefix length is set in accordance with implicit or explicit indicators without requiring timing advance commands, therefore, communications overhead is reduced.

A further advantage of an embodiment is that the uplink cyclic prefix length is adjustable through adjusting the downlink cyclic prefix length, therefore, the signaling overhead of indicating the uplink cyclic prefix length is reduced by taking advantage of the existing indication of downlink CP length.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

The present disclosure will be described with respect to example embodiments in a specific context, namely communications systems that uses different length cyclic prefixes to help maintain signal orthogonality. The disclosure may be applied to standards compliant communications systems, such as those that are compliant with Third Generation Partnership Project (3GPP), IEEE 802.11, and the like, technical standards, and non-standards compliant communications systems, that uses different length cyclic prefixes to help maintain signal orthogonality.

Figure 1:
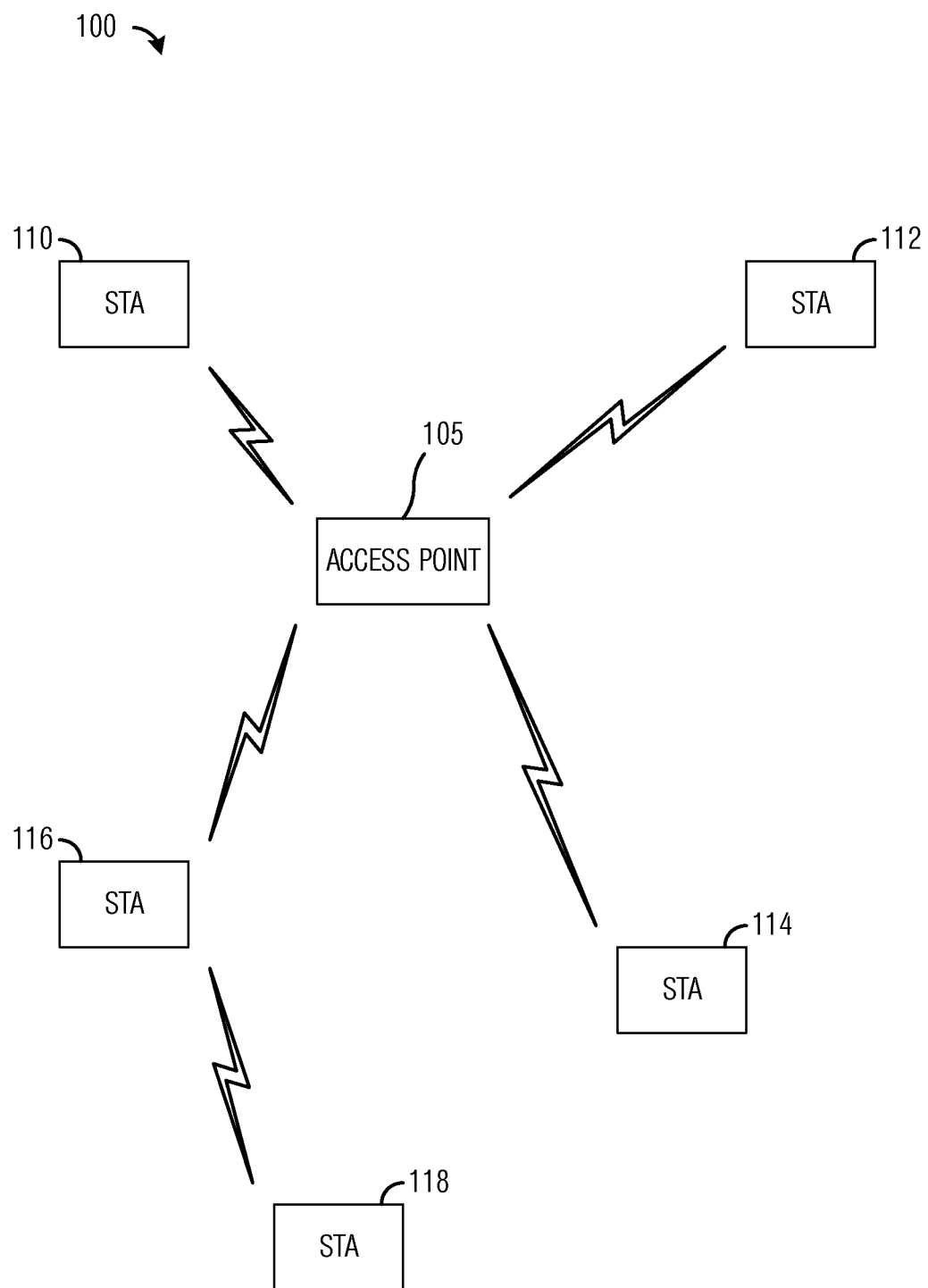
FIG. 1 illustrates wireless communications system in accordance with an embodiment.

FIG. 1 illustrates an example wireless communications system 100. Wireless communications system 100 includes an access point (AP) 105 that serves one or more stations, such as stations (STA) 110-116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118. While it is understood that communications systems may employ multiple APs capable of communicating with a number of stations, only one AP, and a number of stations are illustrated for simplicity.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
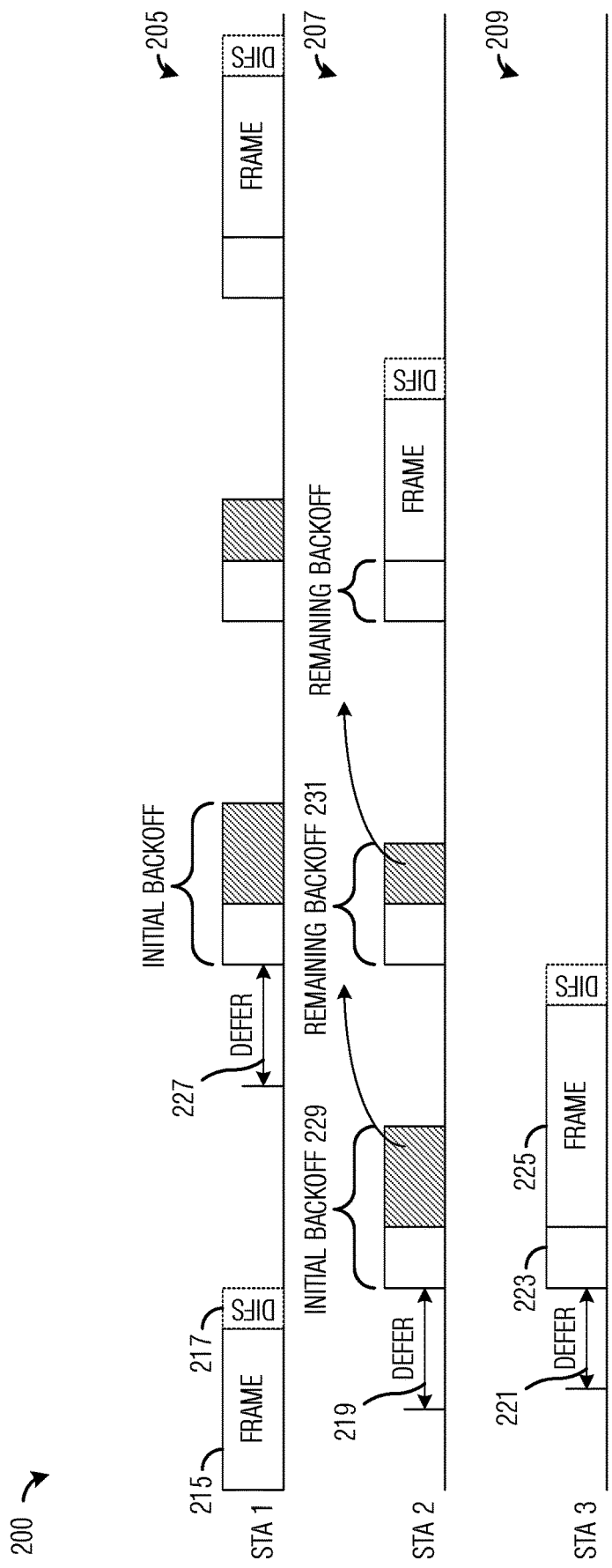
FIG. 2 illustrates a diagram of channel access timing in accordance with an embodiment.

FIG. 2 illustrates a diagram 200 of example channel access timing. A first trace 205 represents channel access for a first station (STA 1), a second trace 207 represents channel access for a second station (STA 2), and a third trace 209 represents channel access for a third station (STA 3). A short inter-frame space (SIFS) has a duration of 16 microseconds, a point coordination function (PCF) inter-frame space (PIFS) has a duration of 25 microseconds, while a distributed inter-frame space (DIFS) may last longer than either the SIFS or the PIFS. A backoff period may be a random duration. Therefore, active scanning may not provide the best solution when there are large numbers of stations attempting to perform AP/network discovery.

In cellular communications systems, e.g., 3GPP LTE compliant communications systems, orthogonal frequency division multiple access (OFDMA) has been shown to be able to provide robust performance in high density environments. OFDMA has the ability to support multiple users simultaneously by carrying traffic from different users on different portions of the communications system bandwidth. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multi-user multiple input multiple output (UL MU-MIMO) techniques have also been used in cellular communications systems, e.g., 3GPP LTE, to enhance communications system performance. UL MU-MIMO allows multiple users to simultaneously transmit on the same time-frequency resource(s) with the transmissions being separated in space (i.e., on different spatial streams).

In order to support OFDMA and/or UL MU-MIMO, it is generally required that the transmitted signals of the multiple users (stations) arrive at the receiver (AP) at substantially the same time, otherwise, orthogonality among the signals from the multiple users may be destroyed. For downlink transmissions, this is readily achieved since the downlink transmissions are from a single AP (or from multiple APs that can easily be coordinated). For uplink transmissions, this typically becomes more difficult since the transmissions are from multiple users and the multiple users may be operating independently, making coordination difficult.

In 3GPP LTE compliant communications systems, uplink synchronization is achieved through an evolved NodeB (eNB) sending timing advance commands to user equipments (UE). eNBs are also commonly referred to as NodeBs, APs, base stations, controllers, communications controllers, and the like. UEs are also commonly referred to as stations, users, subscribers, mobile stations, mobiles, terminals, and the like.

The timing advance value controls the timing offset of a UE's transmission on the uplink. For UEs that are closer to the eNB (hence with shorter propagation delay), a smaller timing advance value may be used. For UEs that are farther away from the eNB (hence with greater propagation delay), a larger timing advance value may be used. By controlling the uplink transmission timing for different UEs, the eNB can make sure that the arrival time of signals originating from multiple UEs are aligned.

However, in a high density environment, sending timing advance commands to a large number of stations may not be feasible. Additionally, IEEE 802.11 compliant communications systems are asynchronous in nature, it is difficult for an AP to estimate the required timing offset for each station due to factors such as the existence of a random backoff interval. Additionally, sending timing advance commands to a large number of stations may consume a considerable amount of resources in the communications system, leading to a large communications system overhead.

According to an example embodiment, an indicator of the use of OFDMA and/or UL MU-MIMO in the uplink is used to inform stations that OFDMA and/or UL MU-MIMO is being used for uplink transmissions and to adjust their cyclic prefix (CP). The length of the cyclic prefix may be based on a value derived from a length of a cyclic prefix used in the transmission of the trigger frame. The length of the cyclic prefix used in the transmission of the trigger frame may be indicated in the trigger frame. As an illustrative example, a station receives uplink scheduling information from its AP. The uplink scheduling information may be carried in a trigger frame. An example of the trigger frame is a stand-alone downlink frame comprising control information such as the uplink scheduling information. Another example of the trigger frame is a downlink frame where the control information such as the uplink scheduling information is sent together with other downlink data. The trigger frame can be in the form of a MAC frame. The trigger frame can also be in the form of a null data packet (NDP) frame. The uplink scheduling information may include an indicator of the use of OFDMA and/or UL MU-MIMO. The indicator may be set to a first value (e.g., TRUE or ON) to indicate that OFDMA and/or UL MU-MIMO is being used for this uplink transmission, and the indicator may be set to a second value (e.g., FALSE or OFF) to indicate that OFDMA and/or UL MU-MIMO is not being used for this uplink transmission. In other words, if the indicator is set to the first value, then multiple stations may be transmitting simultaneously on the uplink. The scheduling information may be transmitted from the AP to the station in a trigger message, for example, with a CP length of $CP_{DL}$ (CP length value for the downlink, which may be signaled in the trigger message). The indicator may be an explicit indicator, meaning that it is present in the uplink scheduling information and the station receiving the uplink scheduling information may readily determine the value of the indicator included in the uplink scheduling information. The indicator may be an implicit indicator, meaning that the station receiving the scheduling information may infer the value of the indicator by examining the uplink scheduling information intended for the station and/or uplink scheduling information intended for other stations.

At the station, as the station receives the uplink scheduling information, the station may decide on the CP length value for the uplink ($CP_{UL}$) that it will use in its uplink transmission as informed by the uplink scheduling information. If the uplink scheduling information includes the indicator set to the second value (i.e., OFDMA and/or UL MU-MIMO is not being used) the station may set its $CP_{UL}$ to a first CP length value (CP1), while if the indicator is set to the first value (i.e., OFDMA and/or UL MU-MIMO is being used) the station may set its $CP_{UL}$ to a second CP length value (CP2), which is derived from $CP_{DL}$.

In general, CP1 may be the same value as $CP_{DL}$ and CP2 is larger than $CP_{DL}$ (and hence CP1) to help accommodate the different propagation delay between different stations and the AP when OFDMA and/or UL MU-MIMO is being used. It is noted that CP2 may be a default value specified by a technical standard, an operator of the communications system, and the like, and may not need to be signaled to the station. It is noted that other values for CP1 and CP2 are possible and that the described relationship of CP1<CP2 may not hold in all situations.

According to an example embodiment, CP2 is derived from a set of possible CP length values. As an illustrative example, a set of possible CP length values is defined (e.g., by a technical standard, an operator of the communications system, and the like) and CP2 is selected from the set of possible CP length values as long as CP2 is larger than or equal to $CP_{DL}$. For discussion purposes, consider a situation where the set of possible CP length values includes 4 values: 0.4 us, 0.8 us, 1.6 us, and 3.2 us. The set of possible CP length values is indexed by a two-bit index: "00", "01", "10", and "11", respectively. Assume that $CP_{DL}$ is 0.8 us (corresponding to index "01") is used for transmission of the trigger frame, so the two-bit index ("01") is indicated in the trigger frame. The station may derive an index for CP2 by incrementing an index for $CP_{DL}$ by value K. The value of K may be a fixed value defined by a technical standard, an operator of the communications system, and the like. Alternatively, the value of K may be signaled by an AP in a system information message, e.g., in a Beacon frame. If the resulting index for CP2 is greater than a maximum index value (e.g., the total number of indices), the station sets the index for CP2 to the maximum index value. The value of CP2 may be determined from the index of CP2. As an illustrative example, consider a situation where K=1, value of $CP_{DL}$=0.8 us, and index of $CP_{DL}$=1, the station may be able to derive the index for CP2 by $$\text{index of } CP_2 = \min(\text{index of } CP_{DL} + K, \text{maximum index value}) = \min(1+1, 3) = 2.$$

Therefore, the value of CP2 (when using the set of possible CP length values and corresponding indices as discussed above)=1.6 us. As another illustrative example, consider a situation where K=3, value of $CP_{DL}$=0.8 us, and index of $CP_{DL}$=1, the station may be able to derive the index for CP2 by $$\text{index of } CP_2 = \min(\text{index of } CP_{DL} + K, \text{maximum index value}) = \min(1+3, 3) = 3.$$

Therefore, the value of CP2 (when using the set of possible CP length values and corresponding indices as discussed above)=3.2 us.

Figure 3:
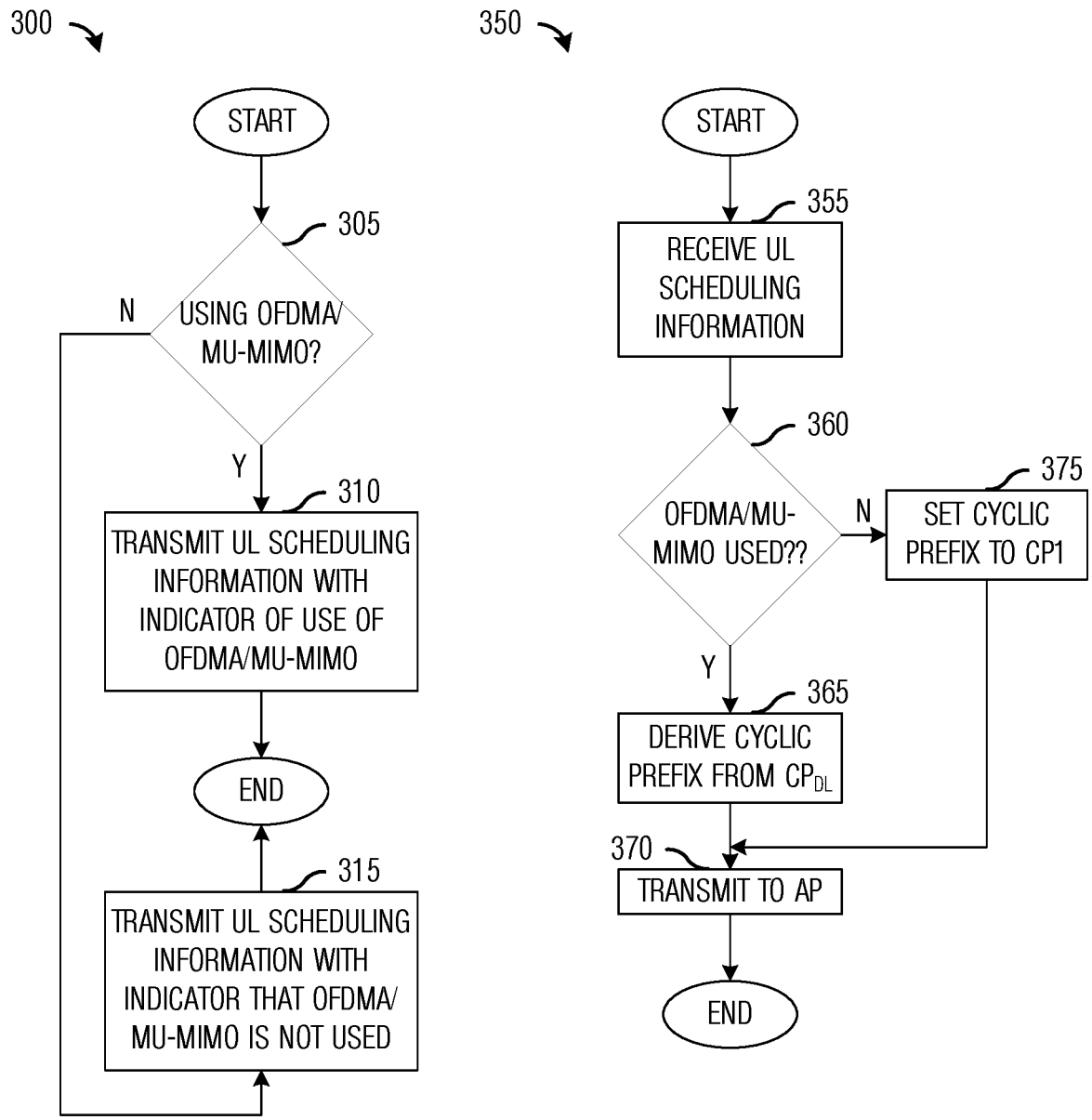
FIG. 3a illustrates a flow diagram of operations occurring in an AP as the AP transmits uplink scheduling information to stations in accordance with an embodiment.
FIG. 3b illustrates a flow diagram of operations occurring in a station as the station transmits to its AP in accordance with an embodiment.

FIG. 3a illustrates a flow diagram of example operations 300 occurring in an AP as the AP transmits uplink scheduling information to stations. The AP may perform a check to determine if it is using OFDMA and/or UL MU-MIMO for the uplink being scheduled (block 305). If it is, the AP may transmit the uplink scheduling information along with the indicator set to indicate that OFDMA and/or UL MU-MIMO is to be used for the scheduled uplink (block 310). If it is not, the AP may transmit the uplink scheduling information along with the indicator set to indicate that OFDMA and/or UL MU-MIMO is not to be used for the scheduled uplink (block 315). The uplink scheduling information may be carried in a trigger frame. In addition to the uplink scheduling information, the trigger frame may also comprise an indicator indicating the cyclic prefix length value for the downlink (e.g., $CP_{DL}$).

FIG. 3b illustrates a flow diagram of example operations 350 occurring in a station as the station transmits to its AP. The station may receive uplink scheduling information from its AP (block 355). The station may also receive the indicator of $CP_{DL}$ from the trigger frame. The station may perform a check to determine if OFDMA and/or UL MU-MIMO is going to be used in the uplink (block 360). If OFDMA and/or UL MU-MIMO is going to be used in the uplink, i.e., the indicator is set to the first value (TRUE or ON), the station sets the value of the UL cyclic prefix to CP2, which may be derived from $CP_{DL}$ (block 365) and transmits to the AP (block 370). If OFDMA and/or UL MU-MIMO is not going to be used in the uplink, i.e., the indicator is set to the second value (FALSE or OFF), the station sets its cyclic prefix length to CP1 or $CP_{DL}$ (block 375) and transmits to the AP (block 370).

In the SIFS after the end of the received uplink scheduling information, the station may start its uplink transmission with cyclic prefix length of $CP_{UL}$ on a resource as indicated in the uplink scheduling information. The technique as presented herein affords greater flexibility in setting UL cyclic prefix length when OFDMA and/or MU-MIMO is used in the UL since the station can derive the UL cyclic prefix length from the DL cyclic prefix length. Therefore, the orthogonality between signals from the different stations is maintained at the receiver (e.g., the AP).

As an illustrative example, assuming the AP coverage is 100 meters, then the maximum round-trip propagation delay is about 0.67 us. With the guard interval (i.e., CP length) of 0.8 us in current 802.11 WiFi system, there is only 0.13 us (0.8-0.67 us) left for mitigating channel delay spread and station timing inaccuracy, which most likely will be inadequate. However, with a longer CP length value, for example, 1.6 us, for the UL when UL OFDMA and/or UL MU-MIMO is used, after deducting the maximum round-trip delay of 0.67 us, there still is about 0.93 us left for mitigating channel delay spread and STA timing inaccuracy, which most likely will be sufficient for most of the scenarios.

According to an example embodiment, low overhead associated with the use of shorter CPs is maintained when longer CPs are not needed. As an example, when OFDMA and/or UL MU-MIMO is not used, the longer CP is not necessary and a shorter CP may be employed, thus reducing the overhead arising from the CP. But when OFDMA and/or UL MU-MIMO is used, although a longer CP is employed, the additional overhead from longer CP will be compensated for due to the use of OFDMA and/or UL MU-MIMO. In fact, additional gain may be achieved due to the use of OFDMA and/or UL MU-MIMO (e.g., supporting transmissions from multiple stations).

Figure 4:
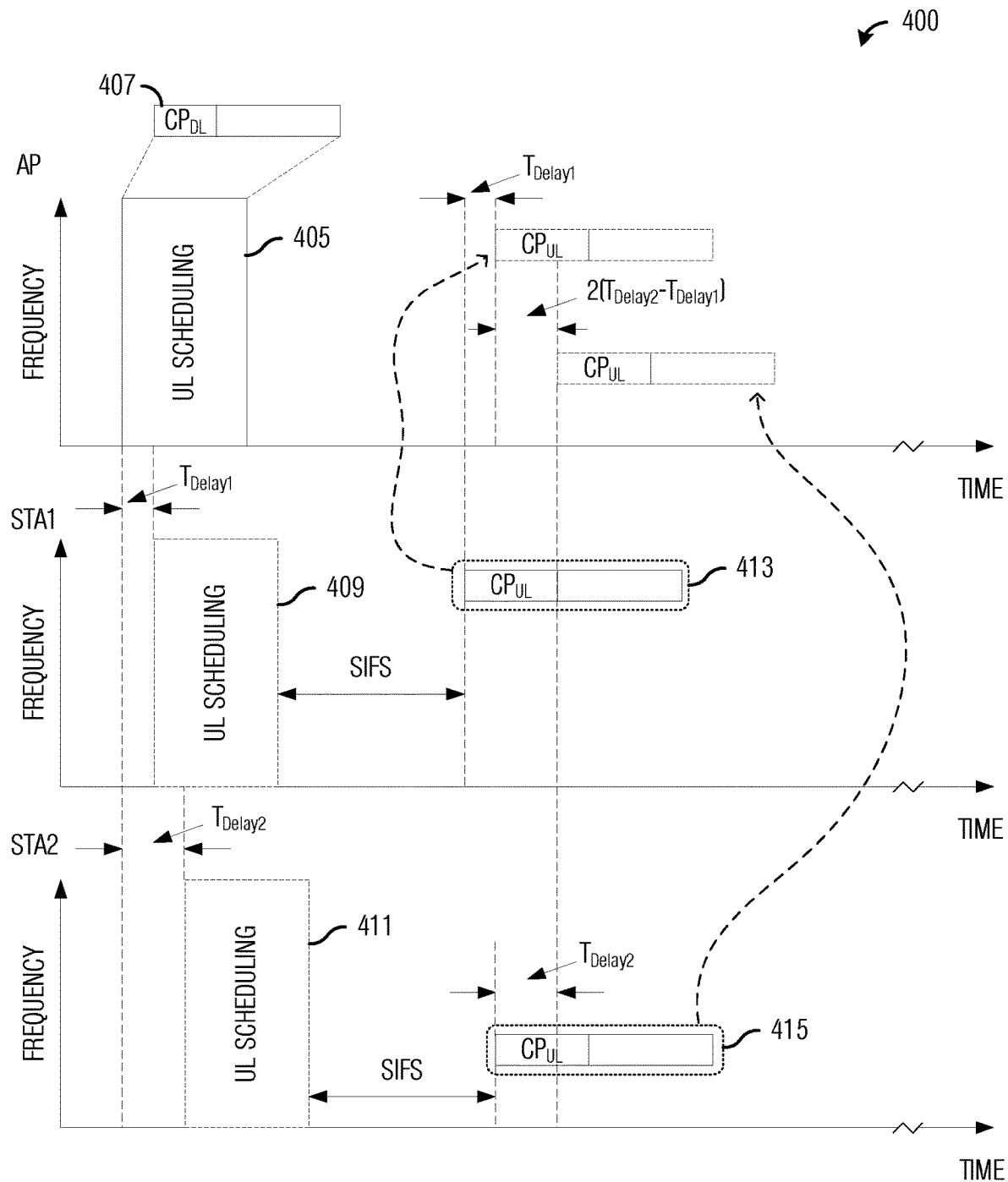
FIG. 4 illustrates an example interaction between an AP and two stations (STA1 and STA2) in accordance with an embodiment.

FIG. 4 illustrates an example interaction 400 between an AP and two stations (STA1 and STA2). It is noted that for simplicity reasons, on both the uplink and the downlink, only one OFDM symbol is shown. In reality, actual downlink and uplink transmissions may occur over a plurality of OFDM symbols. The AP transmits uplink scheduling information 405 to STA1 and STA2 on the downlink, with a CP length of $CP_{DL}$ 407. The uplink scheduling information includes the indicator that OFDMA is to be used on the scheduled uplink transmissions. Due to propagation delay, after $T_{Delay1}$, STA1 receives the uplink scheduling information (shown as uplink scheduling information 409). Similarly, after $T_{Delay2}$, STA2 receives the uplink scheduling information (shown as uplink scheduling information 411). In this example, the distance between STA2 and AP is larger than the distance between STA1 and AP, therefore, $T_{Delay2} > T_{Delay1}$. STA1 and STA2 check their uplink scheduling information, find their resource allocation information, and also find that OFDMA and/or UL MU-MIMO is to be used in the scheduled uplink transmission, so the stations set the CP length of UL transmission $CP_{UL}$ to CP2, which is larger than $CP_{DL}$. The use of OFDMA and/or UL MU-MIMO may be determined from an implicit indicator or an explicit indicator.

At a time SIFS after the end of their received uplink scheduling information, STA1 and STA2 transmit their uplink traffic on their allocated resource, respectively (uplink traffic 413 for STA1 and uplink traffic 415 for STA2), with a CP length of $CP_{UL}=CP2$, which is larger than $CP_{DL}$. Similarly, due to propagation delay, STA1 and STA2's uplink transmissions arrive at the AP after a delay of $T_{Delay1}$ and $T_{Delay2}$, respectively. Considering the round trip delay (e.g., from AP to station, and from station to AP), the difference of the arrival time of STA1 and STA2's uplink signal at AP receiver is $2*(T_{Delay2}-T_{Delay1})$. Since the CP length on the uplink is set to $CP_{UL}=CP_2$, which is larger than $2*(T_{Delay2}-T_{Delay1})$ with sufficient margin, the arrival time difference between STA1 and STA2 can be well accommodated by $CP_{UL}$, and the orthogonality between the uplink signals of STA1 and STA2 at the AP is maintained. The AP receives the uplink transmissions from STA1 and STA2 and performs additional operations accordingly.

Figure 5:
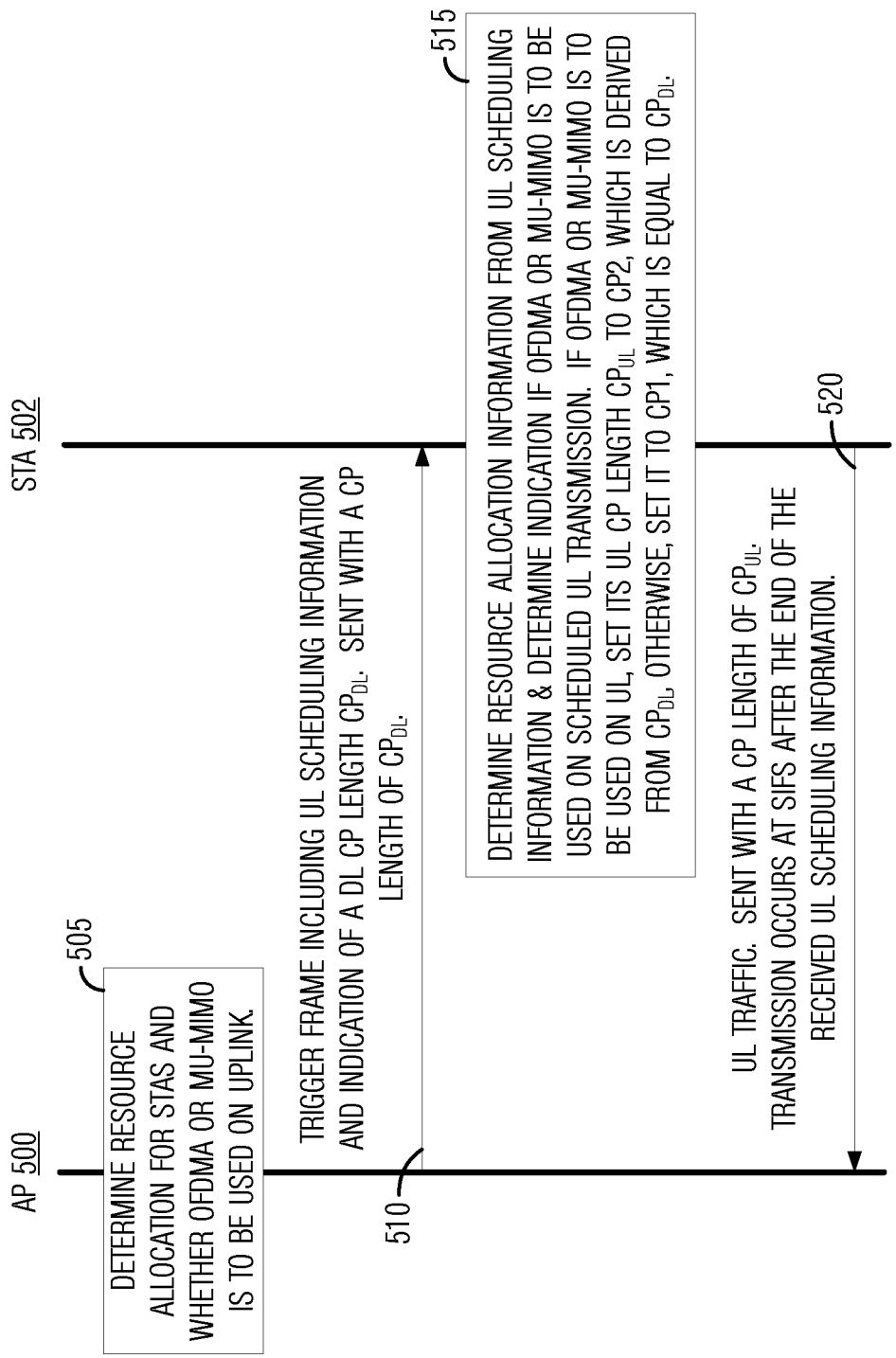
FIG. 5 illustrates a message exchange diagram highlighting messages exchanged between a station and its AP, where an indicator of the use of OFDMA and/or UL MU-MIMO is included in uplink scheduling information in accordance with an embodiment.

FIG. 5 illustrates a message exchange diagram 500 highlighting messages exchanged between a station and its AP, where an indicator of the use of OFDMA and/or UL MU-MIMO is included in uplink scheduling information.

The AP may determine resource allocations for stations, as well as determine if OFDMA and/or UL MU-MIMO is to be used by the stations in transmissions in the resource allocations (block 505). The AP may send UL scheduling information in a trigger frame (shown as event 510). The UL scheduling information is sent with a CP length of $CP_{DL}$. The indication of $CP_{DL}$ may also be sent in the trigger frame. The station receives the UL scheduling information. The station may also receive the indicator of $CP_{DL}$ from the trigger frame. From the UL scheduling information, the station may be able to determine resource allocation information, as well as an indicator if OFDMA and/or UL MU-MIMO are being used in the UL transmission (block 515). If OFDMA and/or UL MU-MIMO is being used, the station may set $CP_{UL}=CP2$ (which is derived from $CP_{DL}$), while if OFDMA and/or UL MU-MIMO is not being used, the station may set $CP_{UL}=CP1=CP_{DL}$. The station may send an UL transmission in a resource(s) allocated for it (shown as event 520). The UL transmission is sent with a CP length of $CP_{UL}$.

According to an example embodiment, to further reduce communications overhead, it is not necessary to carry the indication of whether OFDMA and/or MU-MIMO is to be used in the scheduled UL transmission. Upon receiving the UL scheduling information, the station may determine whether the UL scheduling information includes scheduling information for more than one station. If the scheduling information is for more than one station, the station may determine that OFDM and/or MU-MIMO is to be used in the scheduled UL transmission. The station may set its $CP_{UL}$ to CP2, which is derived from $CP_{DL}$. If the scheduling information is not for more than one station, the station may set its $CP_{UL}$ to CP1. In general, CP2 is larger than CP1.

Figure 6:
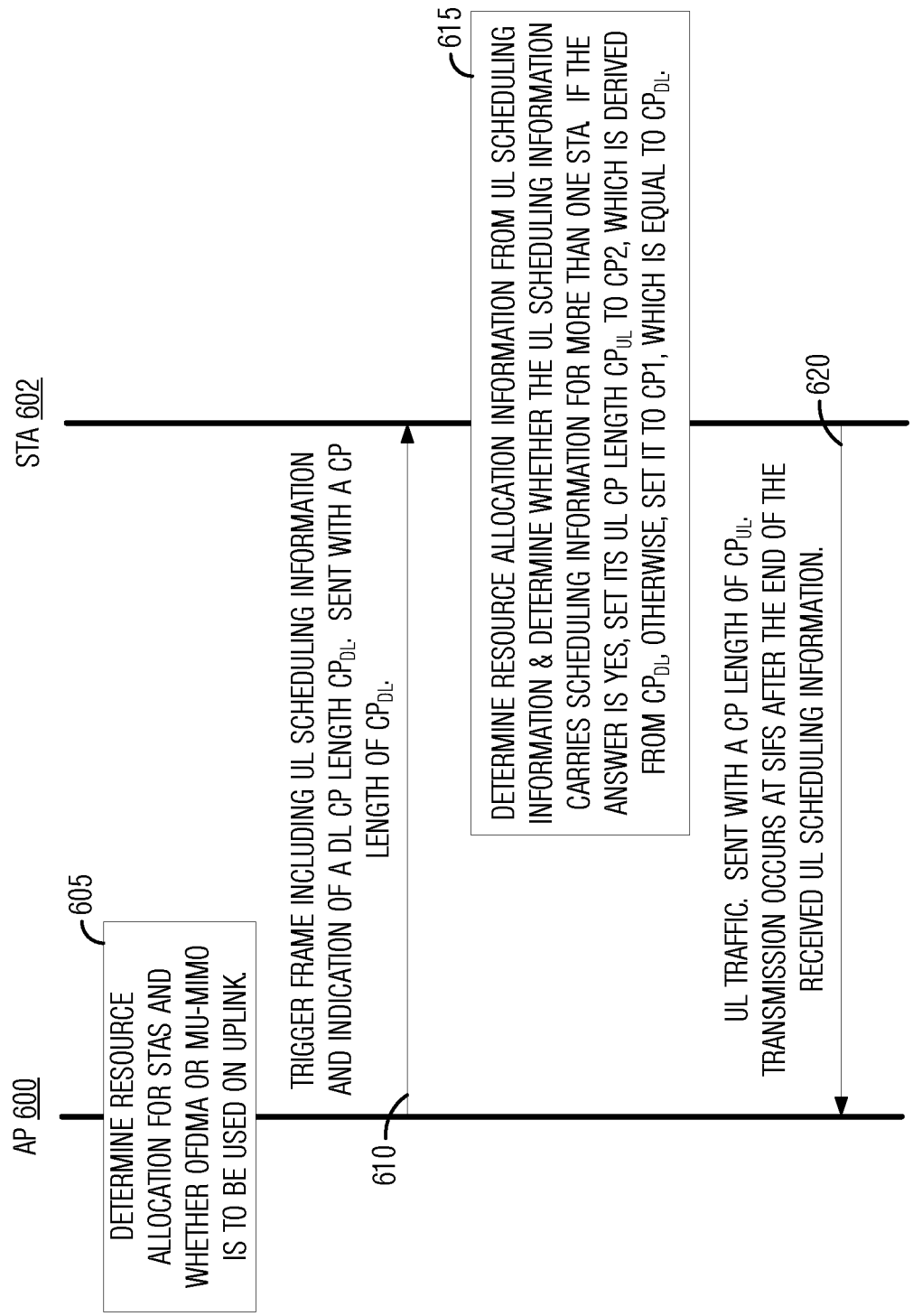
FIG. 6 illustrates a message exchange diagram highlighting messages exchanged between a station and its AP, where the station determines if OFDMA and/or UL MU-MIMO is being used in accordance with an embodiment.

FIG. 6 illustrates a message exchange diagram 500 highlighting messages exchanged between a station and its AP, where the station determines if OFDMA and/or UL MU-MIMO is being used from the scheduling information.

The AP may determine resource allocations for stations, as well as determine if OFDMA and/or UL MU-MIMO is to be used by the stations in transmissions in the resource allocations (block 605). The AP may send UL scheduling information in a trigger frame (shown as event 610). The UL scheduling information is sent with a CP length of $CP_{DL}$. The indication of $CP_{DL}$ may also be sent in the trigger frame. The station receives the UL scheduling information. From the UL scheduling information, the station may be able to determine resource allocation information, as well if OFDMA and/or UL MU-MIMO is being used in the UL transmission (block 615). If OFDMA and/or UL MU-MIMO is being used (i.e., if the UL scheduling information is for more than one station), the station may set $CP_{UL}=CP2$ (which is derived from $CP_{DL}$), while if OFDMA and/or UL MU-MIMO is not being used, the station may set $CP_{UL}=CP1=CP_{DL}$. The station may send an UL transmission in a resource(s) allocated for it (shown as event 620). The UL transmission is sent with a CP length of $CP_{UL}$.

Figure 7A:
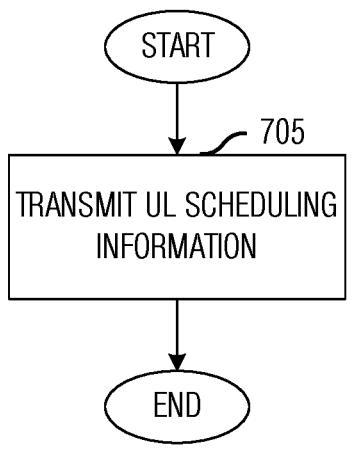
FIGS. 7a and 7b illustrate flow diagrams of example operations occurring in an AP as the AP transmits uplink scheduling information to stations and a station as the station transmits to its AP in accordance with an embodiment.

FIG. 7a illustrates a flow diagram of example operations 700 occurring in an AP as the AP transmits UL scheduling information. Operations 700 may begin with the AP determining resource allocations for stations. The AP may transmit UL scheduling information in a trigger frame (block 705). In addition to the uplink scheduling information, the trigger frame may also comprise an indicator indicating the cyclic prefix length value for the downlink (e.g., $CP_{DL}$).

Figure 7B:
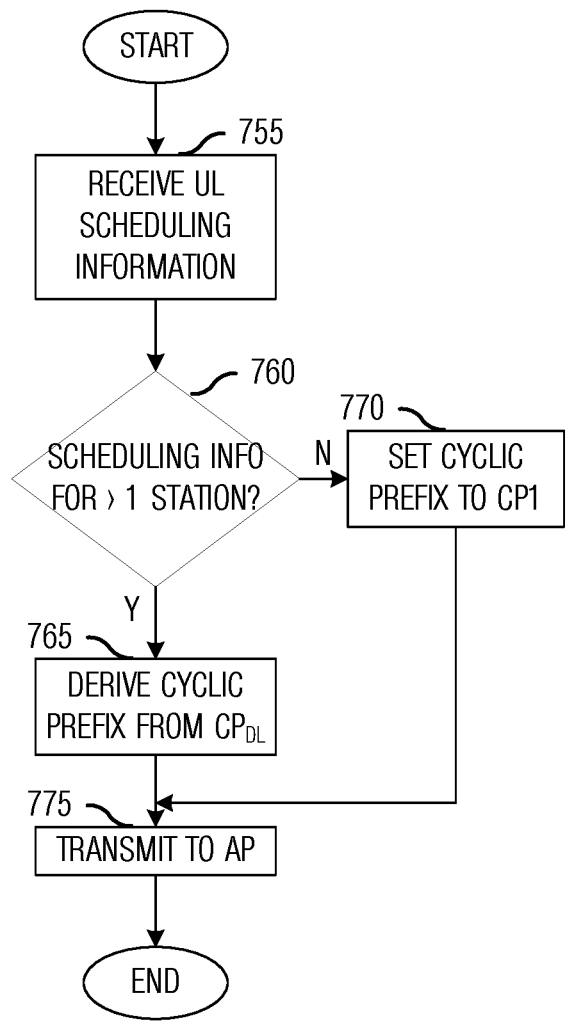

FIG. 7b illustrates a flow diagram of example operations 750 occurring in a station as the station transmits on an uplink. Operations 750 may begin with the station receiving UL scheduling information (block 755). The station may also receive the indicator of $CP_{DL}$ from the trigger frame. The UL scheduling information may include information about a resource(s) scheduled for the station. The station may perform a test to determine if the UL scheduling information is intended for more than one station (block 760). If the UL scheduling information is intended for more than one station, the station may adjust its $CP_{UL}$ in accordance with CP2, which is derived from $CP_{DL}$ (block 765). While if the UL scheduling information is not intended for more than one station, the station adjust its $CP_{UL}$ in accordance with CP1 (block 770). The station may make the UL transmission with CP value as indicated (block 775).

According to an example embodiment, a table is used to derive CP2 from $CP_{DL}$. A table (which may be stored in memory of the station) may provide a mapping between DL cyclic prefix length values and UL cyclic prefix length values for UL transmissions. The station may select the value of CP2 from $CP_{DL}$, which is indicated in the trigger message. An example table is shown below:

| DL CP Length (us) | UL CP Length for UL MU (us) |
|---|---|
| 0.4 | 1.6 |
| 0.8 | 1.6 |
| 1.6 | 3.2 |
| 3.2 | 3.2 |

As an illustrative example, assume that $CP_{DL}$ is 0.8 us. From the table shown above, the station may be able to determine that CP2 should be 1.6 us. As another illustrative example, assume that $CP_{DL}$ is 0.4 us. From the table shown above, the station may be able to determine that CP2 should be 1.6 us. The table may be defined by a technical standard, an operator of the communications system, and the like. The table may also be signaled to the station in system information, e.g., in a Beacon frame.

According to an example embodiment, the value of CP2 may be derived from $CP_{DL}$ using a mathematical expression. As an illustrative example, consider a situation wherein a station receives a trigger frame including a $CP_{DL}$ indicator. The station may add a value ($CP_{delta}$) to $CP_{DL}$ to obtain CP2, where $CP_{delta}$ represents a difference between UL CP length value for UL transmission and DL CP length value. An example mathematical expression may be $$CP2=CP_{DL}+CP_{delta}.$$

If, for example, $CP_{DL}=0.8$ us and $CP_{delta}=1.6$ us, then CP2=0.8+1.6 us=2.4 us. $CP_{delta}$ may be defined in a technical standard, an operator of the communications system, and the like. $CP_{delta}$ may be signaled to the station as system information, e.g., in a Beacon frame.

According to an example embodiment, the value of CP2 may be derived from $CP_{DL}$ using a mathematical expression. As an illustrative example, consider a situation wherein a station receives a trigger frame including a $CP_{DL}$ indicator. The station may multiply a scaling factor ($CP_{scale}$) to $CP_{DL}$ to obtain CP2, where $CP_{scale}$ represents the ratio of UL CP length value for UL transmission to DL CP length value. $CP_{scale}$ may be an integer value or a non-integer (i.e., a real number) value. $CP_{scale}$ is generally larger than 1. An example mathematical expression may be $$CP2=\min(CP_{DL}*CP_{scale},CP_{max}),$$

where $CP_{max}$ is the maximum CP length value. If, for example, $CP_{DL}=0.8$ us, $CP_{scale}=2$ and $CP_{max}=3.2$ us, then CP2=min(0.8*2, 3.2)=1.6 us. $CP_{scale}$ may be defined in a technical standard, an operator of the communications system, and the like. $CP_{scale}$ may be signaled to the station as system information, e.g., in a Beacon frame.

The example embodiments presented herein enable the use of OFDMA and/or UL MU-MIMO, making resource usage more efficient. A cyclic prefix for the uplink ($CP_{UL}$) is longer than the cyclic prefix for the downlink ($CP_{DL}$), which may help to accommodate different propagation delays between different stations and the AP, thereby maintaining the orthogonality among signals from the different stations at the AP. Adaptive cyclic prefix length also helps to maintain low overhead. When OFDMA and/or UL MU-MIMO are not used, longer cyclic prefixes are not necessary and a shorter cyclic prefix may be used, therefore reducing overhead. When OFDMA and/or UL MU-MIMO is used, longer cyclic prefixes are used, but the increased overhead may be compensated for by the additional gain achieved through the use of OFDMA and/or UL MU-MIMO. The example embodiments presented herein also afford greater flexibility in setting UL cyclic prefix length when OFDMA and/or MU-MIMO is used in the UL since the station can derive the UL cyclic prefix length from the DL cyclic prefix length.

Figure 8:
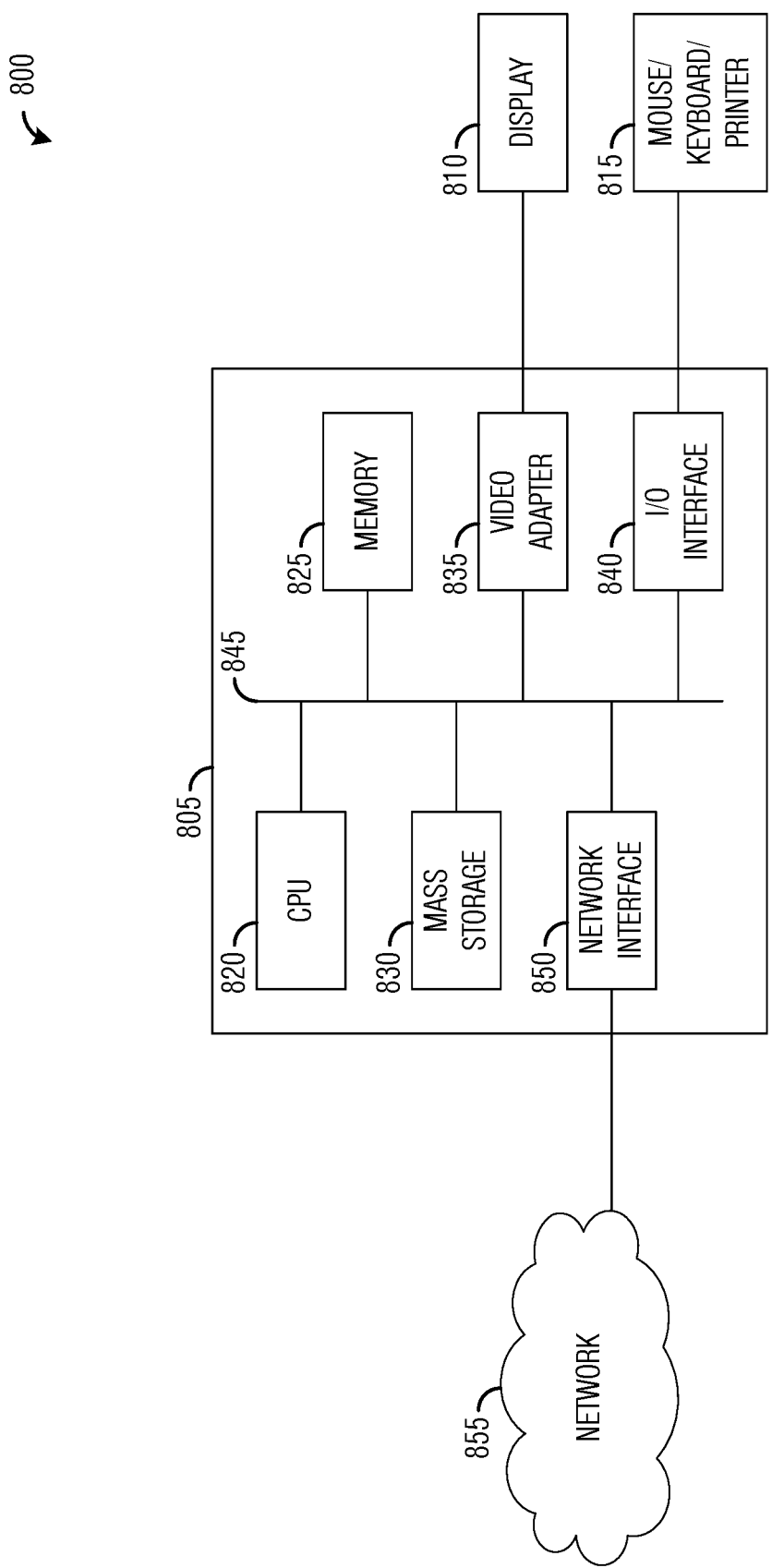
FIG. 8 illustrates a computing platform that may be used for implementing, for example, the devices and methods described herein, in accordance with an embodiment.

FIG. 8 is a block diagram of a processing system 800 that may be used for implementing the devices and methods disclosed herein. In some embodiments, the processing system 800 comprises a UE. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 815 (including speaker, microphone, mouse, touchscreen, keypad, keyboard, printer, and the like), display 810, and so on. The processing unit may include a central processing unit (CPU) 820, memory 825, a mass storage device 830, a video adapter 835, and an I/O interface 840 connected to a bus 845.

The bus 845 may be one or more of any type of several bus architectures including a memory bus or memory controller, a peripheral bus, video bus, or the like. The CPU 820 may comprise any type of electronic data processor. The memory 825 may comprise any type of system memory such as static random access memory (SRAM), dynamic random access memory (DRAM), synchronous DRAM (SDRAM), read-only memory (ROM), a combination thereof, or the like. In an embodiment, the memory 825 may include ROM for use at boot-up, and DRAM for program and data storage for use while executing programs.

The mass storage device 830 may comprise any type of storage device configured to store data, programs, and other information and to make the data, programs, and other information accessible via the bus 845. The mass storage device 830 may comprise, for example, one or more of a solid state drive, hard disk drive, a magnetic disk drive, an optical disk drive, or the like.

The video adapter 835 and the I/O interface 840 provide interfaces to couple external input and output devices to the processing unit 800. As illustrated, examples of input and output devices include the display 810 coupled to the video adapter 835 and the mouse/keyboard/printer 815 coupled to the I/O interface 840. Other devices may be coupled to the processing unit 800, and additional or fewer interface devices may be utilized. For example, a serial interface such as Universal Serial Bus (USB) (not shown) may be used to provide an interface for a printer.

The processing unit 800 also includes one or more network interfaces 850, which may comprise wired links, such as an Ethernet cable or the like, and/or wireless links to access nodes or different networks 855. The network interface 850 allows the processing unit 800 to communicate with remote units via the networks 855. For example, the network interface 850 may provide wireless communication via one or more transmitters/transmit antennas and one or more receivers/receive antennas. In an embodiment, the processing unit 800 is coupled to a local-area network or a wide-area network 855 for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

The invention claimed is:

1. A station comprising:
one or more memories; and
one or more processors in communication with the one or more memories, wherein the one or more processors are configured to execute instructions stored in the one or more memories to cause the station to:
receive scheduling information and a first indicator indicating a first guard interval of a downlink transmission including the scheduling information, the scheduling information comprising information for an uplink transmission scheduled for the station, wherein a duration of the first guard interval indicated in the first indicator is the only guard interval duration used for receiving the scheduling information;
derive a second guard interval for the uplink transmission based at least on the first indicator, wherein the second guard interval is 1.6 us when the first guard interval is 0.8 us, the second guard interval is 3.2 us when the first guard interval is 1.6 us, and the second guard interval is 3.2 us when the first guard interval is 3.2 us; and
transmit the uplink transmission in accordance with the second guard interval.

2. The station of claim 1, wherein the first indicator consists of 2 bits.

3. The station of claim 1, wherein the scheduling information is received together with other downlink data in the downlink transmission.

4. The station of claim 1, wherein orthogonal frequency division multiple access (OFDMA) is to be used in uplink transmissions including the uplink transmission.

5. The station of claim 1, wherein the scheduling information indicates that OFDMA is to be used in uplink transmissions including the uplink transmission.

6. A method, the method comprising:
receiving, by a station, scheduling information and a first indicator indicating a first guard interval of a downlink transmission including the scheduling information, the scheduling information comprising information for an uplink transmission scheduled for the station, wherein a duration of the first guard interval indicated in the first indicator is the only guard interval duration used for receiving the scheduling information;
deriving, by the station, a second guard interval for the uplink transmission based at least on the first indicator, wherein the second guard interval is 1.6 us when the first guard interval is 0.8 us, the second guard interval is 3.2 us when the first guard interval is 1.6 us, and the second guard interval is 3.2 us when the first guard interval is 3.2 us; and
transmitting, by the station, the uplink transmission in accordance with the second guard interval.

7. The method of claim 6, wherein the first indicator consists of 2 bits.

8. The method of claim 6, wherein the scheduling information is received together with other downlink data in the downlink transmission.

9. The method of claim 6, wherein orthogonal frequency division multiple access (OFDMA) is to be used in uplink transmissions including the uplink transmission.

10. The method of claim 6, wherein the scheduling information indicates that OFDMA is to be used in uplink transmissions including the uplink transmission.

11. A method, the method comprising:
receiving, by a station, a first scheduling information and a first indicator indicating a first downlink guard interval of a first downlink transmission including the first scheduling information, the first scheduling information comprising information for a first uplink transmission scheduled for the station, wherein a duration of the first downlink guard interval indicated in the first indicator is the only guard interval duration used for receiving the first scheduling information;
determining, by the station, that the first indicator indicates that the first downlink guard interval is 3.2 us;
deriving, by the station, a first uplink guard interval of 3.2 us for the first uplink transmission based at least on the determination that the first indicator indicates that the first downlink guard interval is 3.2 us;
transmitting, by the station, the first uplink transmission in accordance with the first uplink guard interval and the first scheduling information;

receiving, by the station, a second scheduling information and a second indicator indicating a second downlink guard interval of a second downlink transmission including the second scheduling information, the second scheduling information comprising information for a second uplink transmission scheduled for the station;

determining, by the station, that the second indicator indicates that the second downlink guard interval is 1.6 us;

deriving, by the station, a second uplink guard interval of 3.2 us for the second uplink transmission based at least on the determination that the second indicator indicates that the second downlink guard interval is 1.6 us; and transmitting, by the station, the second uplink transmission in accordance with the second uplink guard interval and the second scheduling information.

12. The method of claim 11, wherein the first indicator consists of 2 bits.

13. The method of claim 11, wherein the first scheduling information is received together with other downlink data in the first downlink transmission.

14. The method of claim 11, wherein orthogonal frequency division multiple access (OFDMA) is to be used in uplink transmissions including the first uplink transmission.

15. The method of claim 11, wherein the first scheduling information indicates that OFDMA is to be used in uplink transmissions including the first uplink transmission.

16. The method of claim 11, wherein the method further comprises:

receiving, by the station, a third scheduling information and a third indicator indicating a third downlink guard interval of a third downlink transmission including the third scheduling information, the third scheduling information comprising information for a third uplink transmission scheduled for the station;

determining, by the station, that the third indicator indicates that the third downlink guard interval is 0.8 us;

deriving, by the station, a third uplink guard interval of 1.6 us for the third uplink transmission based at least on the determination that the third indicator indicates that the third downlink guard interval is 0.8 us; and transmitting, by the station, the third uplink transmission in accordance with the third uplink guard interval and the third scheduling information.

17. An apparatus comprising:
one or more memories; and
one or more processors in communication with the one or more memories, wherein the one or more processors are configured to execute instructions stored in the one or more memories to cause the apparatus to:

transmit, to a station, scheduling information and a first indicator indicating a first guard interval of a downlink transmission including the scheduling information, wherein the scheduling information comprises information for an uplink transmission scheduled for the station, wherein a duration of the first guard interval indicated in the first indicator is the only guard interval duration used for transmitting the scheduling information; and receive, from the station, the uplink transmission with a second guard interval derived based at least on the first indicator, wherein the second guard interval is 1.6 us when the first guard interval is 0.8 us, the second guard interval is 3.2 us when the first guard interval is 1.6 us, and the second guard interval is 3.2 us when the first guard interval is 3.2 us.

18. The apparatus of claim 17, wherein the scheduling information is for uplink transmissions scheduled for a plurality of stations, and orthogonal frequency division multiple access (OFDMA) is to be used in the uplink transmissions including the uplink transmission.

19. The apparatus of claim 17, wherein the first indicator consists of 2 bits.

20. The apparatus of claim 17, wherein the scheduling information is transmitted together with other downlink data in the downlink transmission.

21. The apparatus of claim 17, wherein OFDMA is to be used in uplink transmissions including the uplink transmission.

22. The apparatus of claim 17, wherein the scheduling information indicates that OFDMA is to be used in uplink transmissions including the uplink transmission.

* * * * *